United States Patent [19]

Mikulski

[11] Patent Number: 4,503,426
[45] Date of Patent: Mar. 5, 1985

[54] VISUAL COMMUNICATION DEVICE

[76] Inventor: Walter J. Mikulski, 16522 Cumberland Rd., Orange, Calif. 92665

[21] Appl. No.: 373,362

[22] Filed: Apr. 30, 1982

[51] Int. Cl.³ .............................................. G09B 3/00
[52] U.S. Cl. .................................. 340/711; 340/778; 364/900; 400/63; 434/157
[58] Field of Search ...................... 340/711, 798, 799; 364/900; 434/157, 112, 113, 114; 400/63

[56] References Cited

U.S. PATENT DOCUMENTS

| | | | |
|---|---|---|---|
| 3,925,779 | 12/1975 | Gerstenhaber | 340/756 X |
| 4,218,760 | 8/1980 | Levy | 434/157 X |
| 4,228,507 | 10/1980 | Leban | 340/711 X |
| 4,339,806 | 7/1982 | Yoshida | 400/63 X |
| 4,367,537 | 11/1983 | Yoshida | 400/63 X |
| 4,383,307 | 5/1983 | Gibson | 364/900 |
| 4,402,058 | 8/1983 | Aiken, Jr. et al. | 340/711 X |

Primary Examiner—Marshall M. Curtis
Assistant Examiner—Vincent P. Kovalick
Attorney, Agent, or Firm—Charmasson & Holz

[57] ABSTRACT

A visual communication device for displaying combinations of written words which are entered by manipulation of an efficiently organized keyboard. The keyboard has certain keys specifically dedicated to a set of the words recurring most frequently in common conversational language as well as keys corresponding to discrete letters of the alphabet for spelling less-frequently used words.

The keyboard is backed up by an extensive list of common terms stored in a memory. Each word is automatically fetched from the memory and displayed on a multi-digit alpha-numerical readout as soon as a number of leading characters sufficient to identify the word has been entered; thus, dispensing the operator from keying the remaining characters. In this first version, the device can be used by a person with auditory or vocal disability to quickly enter phrases in the readout by a much lesser number of manipulations than would be required if each word had to be spelled one letter at a time on the keyboard.

11 Claims, 13 Drawing Figures

VISUAL COMMUNICATION DEVICE

FIELD OF THE INVENTION

The present invention relates to visual communicators and learning systems for persons affected with surdimutism. It also relates to the implementation of keyboard entry devices for wireless communicators and data processing machines. The invention further relates to language translators and, more specifically, to those with morphological and syntactic interpretation capabilities.

BACKGROUND OF THE INVENTION

Pending the development of reliable voice-responding data entry machines, the bulk of information entered into data processing machines is done by means of keyboards. This process requires the painstaking and time-consuming task of spelling out each word character by character. Substantial progress has been made in the layout of keyboards whereby keys for the most often-used letters of the language are grouped in the most conveniently accessible sections of the keyboard. Yet, even the most dextrous typists can achieve typing speeds of little more than 1.2 words per second. Higher speeds can only be reached through the use of shorthand techniques and machines requiring a second level interpretation.

Persons affected with auditory or speech disability must rely on visual communication devices operated by means of a keyboard. Improvements in this area designed to speed up the entry of information to be visually displayed have for the most part consisted of replacing character keys with descriptive symbols. For instance, the keyboard of such a device would have keys marked with descriptive symbols for items of clothing, bed, drink, food, glasses, etc. Depressing such a key causes a written or pictoral description of the corresponding object to be displayed on a particular readout so that the operator can communicate his needs for these particular objects or services. The communication capability of such machines is severely limited by space restriction in the layout of the keyboard.

Keyboards are also used in non-verbal communication devices such as telexes and electronic language translators.

The advent of micro-electronics has led to the development of hand-held electronic dictionaries by means of which the translation into a selected target foreign language of a word entered in the operator's own language can be quickly obtained. These devices are of limited usefulness in the translation of structured language. Since they can only provide the equivalent foreign term for the word keyed into the machine, they do not provide the morphological and syntactic interpretation required to accurately turn a phrase of the base language into its correct interpretation in the target language. A pocket translator should provide both an efficient keyboard entry procedure as well as a correct grammatical interpretation process.

SUMMARY OF THE INVENTION

The principal object of the instant invention is to provide an efficient technique for organizing and interpreting the mechanical entry of information via a keyboard.

Another object of the invention is to implement such a system whereby the most commonly used terms of the operator's language can be accessed by means of specifically dedicated keys.

It is also the object of the invention to provide a convenient visual communicating device for persons affected with auditory or vocal disabilities.

It is also a main object of this invention to provide a technique for morphological and syntactic interpretations of phrases and sentences from one base language into a target foreign language of such simplicity that they may be implemented in pocket-sized translators for convenient use by students, tourists and traveling businessmen.

DESCRIPTION OF THE PREFERRED EMBODIMENT OF THE INVENTION

The preferred embodiment of the invention which is illustrated in the drawing will now be described. This embodiment comprises a communicator-translator unit 1 which is housed in a pocket-sized enclosure 2 illustrated in FIG. 1. The unit has two basic interactive components: a keyboard 3 and an alpha-numnerical readout 4 which allows the operator to manually enter individual words, phrases and structured sentences, and to display them. The information is first displayed in the base language in which it is entered, then translated on command into a selected target language. The target language version of the information is automatically substituted for the original entry on the readout 4. In this embodiment, English and Spanish can be alternately selected as either the base language or the target language. Although the techniques disclosed herein have been specifically adapted to the entry, display and translation of these two particular languages, it should be understood that the unit could be adapted to other idioms within the scope of the invention and to take into account their particular grammatical requirements.

Figure 1:
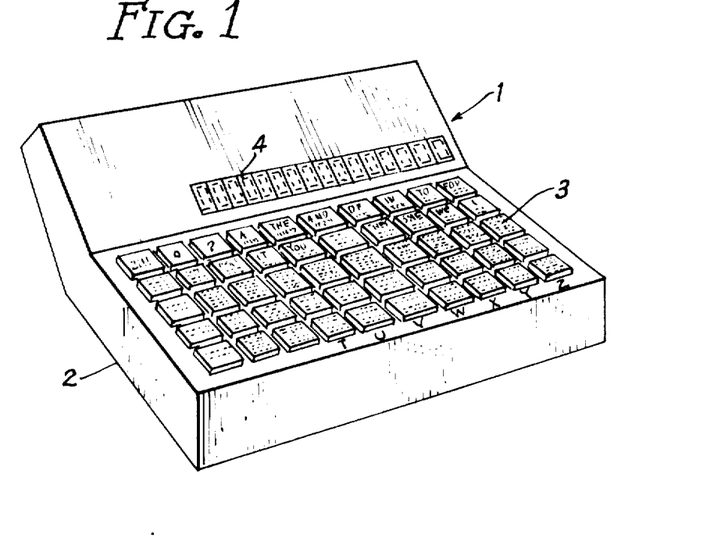
FIG. 1 is a perspective view of the Visual Communicator Device.

The readout 4 features sixteen in-line alpha-numerical character stations of a Light Emitting Diode type.

Figure 3:
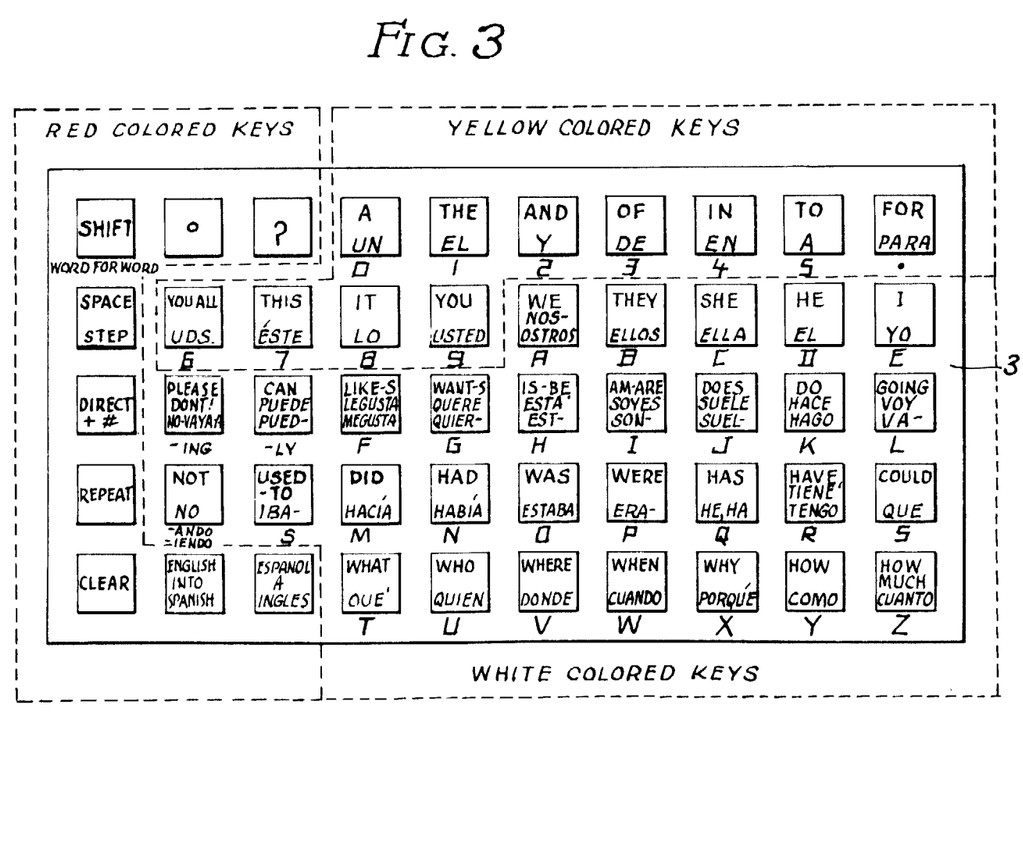
FIG. 3 illustrates the layout of the keyboard.

The layout of the keyboard 3 is illustrated in FIG. 3. It comprises single-use and multi-use keys marked with legends in both the base and the target languages. In order to expedite the keying of information 41 keys have been dedicated, in a first mode of operation, to the entry of 43 particular terms which recur most often in either conversational English or conversational Spanish. These keys are colored yellow or white and are grouped in the following logical sequence. The first row is used for the most useful words. The second row features the personal pronouns. The third row groups the auxiliary verbs in the present and future form. The fourth row groups the auxiliary words for the past tenses. The fifth and last row is reserved for interrogative pronouns and adverbs. In a second mode, the same 41 keys may be used to enter the particular character printed under each key. It should be noted that each one of the yellow keys, regardless of the mode of operation, is taken to represent a complete alphabetical or numerical word. The white keys are used in the upper-case mode to enter complete words in the predicate phrase, and in the lower-case mode to enter a single letter, to spell words and to append certain suffixes to the end of words. The red keys are used to control special functions as will be explained later.

Figure 2:
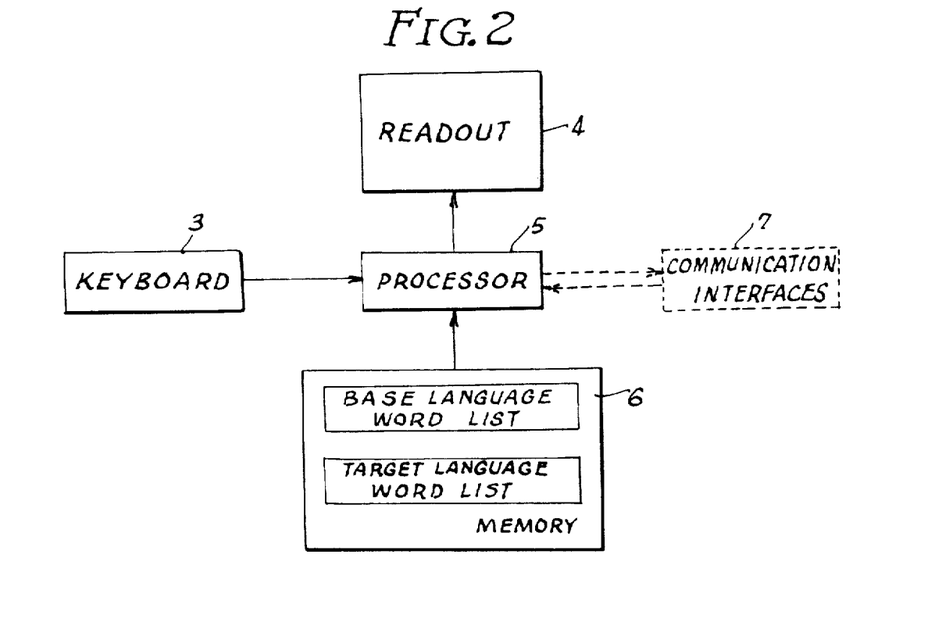
FIG. 2 is a general functional block diagram thereof.

FIG. 2 is a general block diagram of the unit. Entries from the keyboard 3 are analyzed by a data processor 5. The processor operates in conjunction with a vocabulary storage memory 6 which holds the base language and target language versions of each word. The processed message is displayed sequentially in each language in the readout 4. An optional communication interface 7 provides for the transmission of the displayed message to a remote place.

In order to operate the unit in its most efficient mode, it is necessary to restrict the structure of the sentences to a standard format. This format comprises an optional subject phrase, a mandatory predicate phrase and an optional object phrase. The predicate phrase must contain only the auxiliary terms of the keyboard 3. These limitations require some paraphrasing of the base language sentence in order to make maximum use of the unit's translating capabilities. For instance, it should be noticed that the auxiliary forms "shall" and "will" are not available on the keyboard 3 for forming the future tense. Accordingly, it is necessary to use the gerund phrase "going to" preceded by the appropriate form of the auxiliary verb "to be". The operator will quickly accustom himself to a proper choice of sentence structure which in all cases constitutes a reasonably acceptable conversational form of the language.

It now can be understood that the mandatory use of auxiliary forms greatly alleviates the storage requirements and processing tasks of the unit. Only the conjugation forms of the auxiliaries shown on the keyboard need to be recognized. The main verbs can be stored in their infinitive form and are only subject to the two ending changes necessary to form the gerund and past participle. The keys of the keyboard 3 are programmed to operate in the upper-case, i.e., in the "word" mode ab initio. The red SHIFT key must be actuated to start the lower-case mode and then to return to the upper case mode in the same sentence. Since the predicate phrase is entered in the upper-case mode, following the subject phrase, and before the object phrase is entered, a shift command always appears between these various phrases in a particular sentence. The following examples illustrate the proper use of the upper-case SHIFT key.

The device data bases, i.e., the vocabulary lists, are stored in a series of EPROM's. This data base is subdivided into the two sections: the Main Vocabulary Storage (MVS), and the Keyboard Vocabulary Storage (KVS), which has a 256-byte/section dedicated to the characters, numbers, words and their combinations which can be directly entered by the actuation of a single key.

In order to expedite the fetching of words from the data base and to minimize the storage requirement, the alphabet is divided into two groups of letters. Those letters which are most frequently used (A, C, D, H, I, L, M, N, O, R, S, T, N and U); and those which do not recur as often in the English and Spanish languages (B, F, G, J, K, P, Q, V, W, X and Y). Only four bits are used to represent the letters in the first group. One letter from each group can thus be stored in a single 8-bit address location. The hexadecimal code F is used to indicate that the following half-byte contains a letter of the second group. The device is programmed to interpret each half byte as a letter of the first group unless it is preceded by hexadecimal F. A zero is used to indicate the end of a word. It is estimated that this compact storage method yields a thirty percent savings on memory space. Table A illustrates the addressing and coding arrangement of a section of the KVS.

TABLE A

| KEYBOARD VOCABULARY STORAGE (KVS) | | | |
|---|---|---|---|
| | BYTES | | CORRESPONDING |
| WORD | Address | Contents | LETTERS |
| ESTA | 3C | 0 3 | E |
| | 3D | A B | S T |
| | 3E | D 0 | A |
| ARE | 3F | D 9 | A R |
| | 40 | 3 0 | E |
| ES | 41 | 3 A | E S |
| IS | 42 | 0 5 | I |
| | 43 | A 0 | S |
| LA | 44 | 6 D | L A |
| THE | 45 | 0 B | T |
| | 46 | 4 3 | H E |
| A | 47 | 0 D | A |
| TO | 48 | 0 B | T |
| | 49 | 8 0 | O |
| DE | 4A | 2 3 | D E |
| OF | 4B | 0 8 | O |
| | 4C | F 3 | F |
| ESTABA | 4D | 0 3 | E |
| | 4C | A B | S T |
| | 4F | D F | A |
| | 50 | 1 D | B A |
| WERE | 51 | 0 F | |
| | 52 | 7 3 | W E |
| | 53 | 9 3 | R E |
| UDS | AD | C 2 | U D |

| | | Predicate Phrase | |
|---|---|---|---|
| (a) | SHIFT the man | SHIFT DOES NOT LIKE TO | SHIFT work in the shop. |
| (b) | | YOU DO | SHIFT swim well. |
| (c) | | SHE DID NOT WANT TO DO IT. | |
| (d) | SHIFT a red house. | | |
| (e) | SHIFT the boy-s | SHIFT WERE NOT GOING TO HAVE IT. | |
| (f) | SHIFT that dog | SHIFT WHEN IS IT | SHIFT sleep-ing here? |
| (g) | | WHY DID THEY HAVE TO | SHIFT rob the store? |
| (h) | SHIFT the ugly ghost | SHIFT | SHIFT in the movies. |
| (i) | SHIFT this little girl | SHIFT | SHIFT walking slowly. |
| | | SHIFT SHE COULD NOT BE | SHIFT go-ing to my house. |
| (j) | SHIFT my father SHIFT | SHIFT HAS SHIFT | SHIFT read your article and SHIFT taken notes. |
| (k) | SHIFT my father SHIFT a professional newspaper | SHIFT HAS | SHIFT read your article in. |

TABLE A-continued

KEYBOARD VOCABULARY STORAGE (KVS)

| WORD | BYTES | | CORRESPONDING LETTERS |
|---|---|---|---|
| | Address | Contents | |
| | AE | A 0 | S |
| YO | B2 | F 9 | Y |
| | B3 | 8 0 | O |
| I | B4 | 5 0 | I |
| USTED | B5 | C A | U S |
| | B6 | B 3 | T E |
| | B7 | 2 0 | D |
| YOU | B8 | F 9 | Y |
| | B9 | 8 C | O U |
| ELLA | BA | 0 3 | E |
| | BB | 6 6 | L L |
| | BC | D 0 | A |
| SHE | BD | A 4 | S H |
| | BE | 3 0 | E |
| ELLOS | BF | 3 6 | E L |
| | C0 | 6 8 | L O |
| | C1 | A 0 | S |
| THEY | C2 | B 4 | T H |
| | C3 | 3 F | E |
| | C4 | 9 0 | Y |

It should be noted that words are grouped in the KVS memory according to their functions. Thus, the address of the word itself indicates whether it is a verb or a pronoun. It should also be noted that words are stored adjacent to their translation.

The addresses of the words stored in the KVS are grouped in a separate section of the data base called Keyboard Lookup Table (KLT). In the KLT, addresses of all the characters, letters or words which may be entered from a single key and their possible translation are grouped together. Table B illustrates the organization of a section of the KLT. The addresses of the letter P and that of the various forms of the verb "to be" (and Spanish translation), which can be entered by means of a single key, are held at the locations 47 through 50. The processor 5 has the ability to select among these entries the one which must be displayed according to the circumstances.

TABLE B

| KEYBOARD LOOK-UP TABLE (KLT) | | |
|---|---|---|
| Address | Contents | Corresponding Word |
| 3 D | C D | |
| 3 E | F 4 | P |
| 3 F | 5 1 | WERE |
| 4 0 | 6 A | WAS |
| 4 P | 6 A | WAS |
| 4 2 | 6 8 | ERA |
| 4 3 | 6 8 | ERA |
| 4 4 | 4 D | ESTABA |
| 4 5 | 4 D | ESTABA |
| 4 6 | 0 1 | SER |
| 4 7 | E D | |
| 4 8 | 0 5 | I |
| 4 9 | 3 F | ARE |
| 4 A | 4 2 | IS |
| 4 B | 6 6 | AM |
| 4 C | 4 1 | ES |
| 4 D | 6 4 | SOY |
| 4 E | 3 C | ESTA |
| 4 F | 1 1 | ESTOY |
| 5 0 | 0 1 | BE |

Fetching from the MVS area of the data base of words which are spelled, character-by-character, using the lower case entry mode, follows a different procedure. After spelling one or more leading characters of the desired word, the operator presses the STEP key. At this point the keyed data, held in a special register called Letter Processing Area (LPA) is sequentially compared to the words stored into the MVS. As soon as a coincidence is detected between the LPA contents and the leading character of a MVS word, that word is fetched and displayed. If the displayed word does not correspond to the desired one, the operator presses the SPACE key, causing the device to step through the remaining part of the MVS until the next matching work is found. The process is repeated until the readout displays the desired word. The operator can then proceed to the next key entry without touching the SPACE key. If the program reaches the end of the MVS without finding the desired word, an appropriate error message is displayed.

The formating of the phrases and sentences and the selection of the proper conjugation forms which are necessary to complete a grammatically correct translation is done in an area of the memory 6 called the Sentence Pattern Storage (SPS). The SPS does not hold, or operate upon, the words themselves, but only their addresses. Accordingly, the SPS receives the word address fetched from the KLT and those obtained through the search and compare process described earlier in connection with the spelled words found in the MVS.

Figure 4:
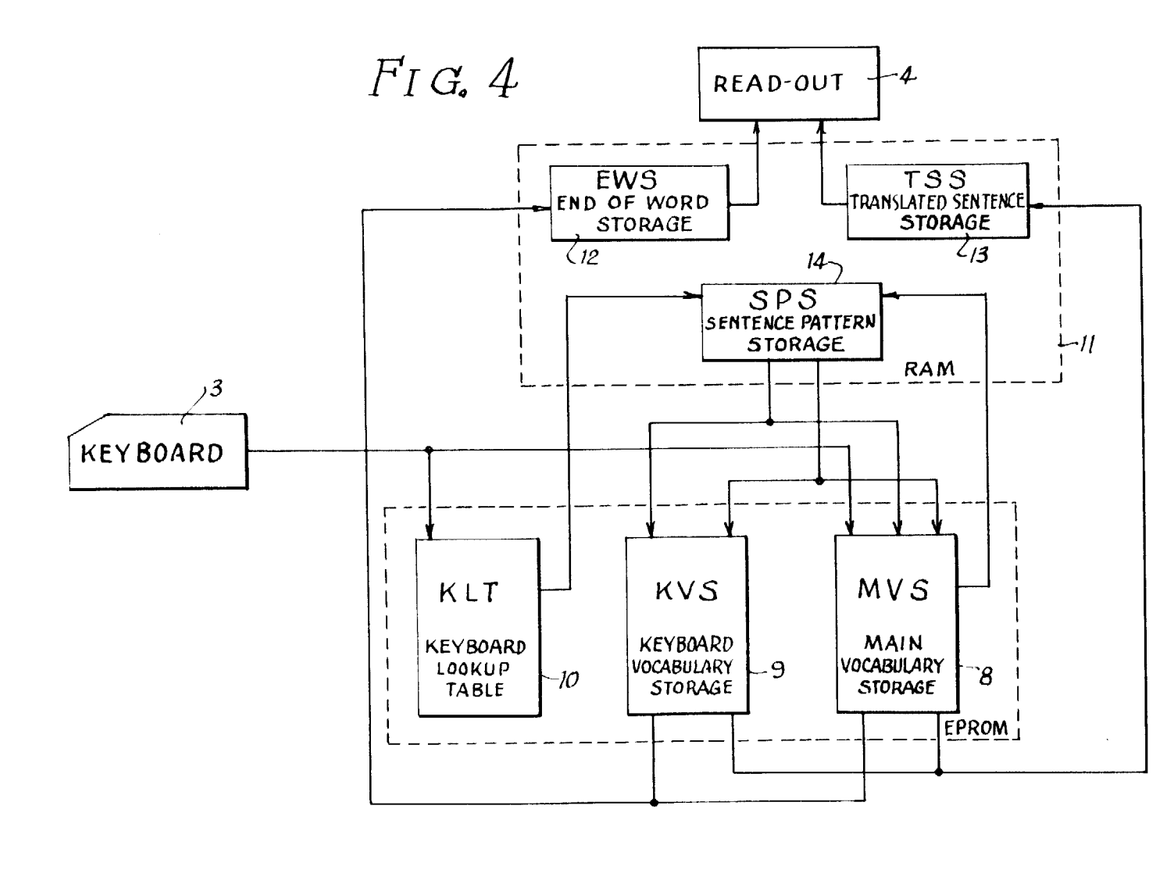
FIG. 4 is an expanded functional block diagram.

The expanded block diagram of FIG. 4 illustrates the important role played by the SPS.

As the operator enters a message through the keyboard 3, the KLT 10 is first addressed; and the address of the corresponding word is stored in the SPS 14. The SPS in turn, addresses the KVS 9 or MVS 8. The letters and words are then extracted from the memory and stored in the End of Word Storage (EWS) 12 which is associated with the alphanumeric readout 4. During the translation process, the SPS is loaded with the addresses of the target language words and causes these words to be extracted from the KVS, the MVS, or both, and to be stored in the Translated Sentence Storage (TSS) 13. The contents of the TSS appears on the readout 4 in place of the base language version. The KLT, KVS and MVS are all part of the Erasable Programmable Memory (EPROM) 6. The SPS, EWS, and TSS are parts of a Random Access Memory (RAM) 11.

The operation of the SPS can be best understood by referring to Table C which illustrates its organization. The SPS is subdivided into twenty-one slots labeled A through U. Each slot is made from two bytes which suffice to hold the address of a vocabulary word and various indexes and codes which are used in the processing of that word. The three first slots are dedicated to the subject phrase; the first slot being dedicated to the pronoun or article, the second slot to the adjective, and the third to the noun. When the SPS contains the Spanish translation, the function of the second and third slots are inverted in order to accommodate the Spanish habit of putting the adjective after the qualified noun. Slots D through K are reversed for the predicate phrase. This section of the SPS holds addresses of words which are entered via the word keys. It should be noted that the English version can hold up to three auxiliary verbs. This provides sufficient flexibility to construct such phrases as "she did not want to do it38 or "they were not going to have it". The Spanish version can be written with the use of a lesser number of auxiliary verbs. Accordingly, the slot J is used to store the address of the preposition "a", or the addresses of the suffixes for the third and second person plural forms of verbs, as might be required. Slots L through T are reserved for storing the addresses of the words forming the object phrase. Slots T and S are reserved for words which are either found in the MVS or are entered letter by letter under control of the DIRECT key and which are not translated; but are transposed directly into the translated sentence. These slots also receive the overflow from the object phrase. Slot U is used for the punctuation and holds the address of either the period or question mark.

slots H, I and J. The term RUN could be either a noun or a verb. The processor examines the term which follows the past auxiliary verb in the predicate phrase to resolve the ambiguity. A lack of word or an article would indicate that the word "RUN" is a noun. The presence of the preposition "TO" however, always indicates that the following term is a verb to be entered in slot L. The adverb "SO" has a specially dedicated slot P. The following word can only be an adjective or adverb whose address is automatically stored in slot

TABLE C

SENTENCE PATTERN STORAGE (SPS) ORGANIZATION

| | Slot | RAM Address | | English Function | Spanish Function | Examples | | | |
|---|---|---|---|---|---|---|---|---|---|
| Subject Phrase | A | 30 | 31 | Pronoun or Article | Pronoun or Article | THE | LOS | | |
| | B | 2E | 2F | Adjective | Noun | BIG | CABALLOS | | |
| | C | 2C | 2D | Noun | Adjective | HORSE-S | NEGROS | | |
| Predicate Phrase | D | 2A | 2B | Pronoun | Pronoun | | | THEY | |
| | E | 28 | 29 | Adverb | Adverb | | | | |
| | F | 26 | 27 | Auxiliary | Negative | ARE | NO | COULD | NO |
| | G | 24 | 25 | it Pronoun | Lo | | | | |
| | H | 22 | 23 | Negative | Auxiliary | NOT | VAN | NOT | PODIAN |
| | I | 20 | 21 | To Auxiliary | Auxiliary | GOING | | BE | ESTAR |
| | J | 1E | 1F | To Auxiliary | A -N -MOS | TO | A | | |
| | K | 1C | 1D | Auxiliary Preposition or Article | Preposition Article | | | | |
| Object Phrase | L | 1A | 1B | In Or Verb | Verb | RUN | CORRER | FLY | VOLA |
| | M | 18 | 19 | -ING | -NDO | | | -ING | -NDO |
| | N | 16 | 17 | Preposition | Preposition | | | TO | A |
| | O | 14 | 15 | Pronoun or Article | Pronoun or Article | | | OUR | NUESTRA |
| | P | 12 | 13 | So-Very | Noun | SO | | | |
| | Q | 10 | 11 | Adjective or Adverb | MUY TAN -s | QUICK | TAN | | CASA |
| | R | 0F | 0F | -LY or Noun or Adverb | Adjective | -LY | RAPID | HOUSE | |
| Extra Words | S | 0C | 0D | Adverb/ Conjunct Direct Word -S | -AMENTE Adverb/Conjunct -S or Direct Word | | AMENTE | IN | EN |
| | T | 0A | 0B | Direct Word | Direct Word | NOW | YA | AUSTIN | AUSTIN |
| Punctuation | U | 08 | 09 | Punctuation | Punctuation | 0 | 0 | 0 | 0 |

The morphological and syntactic manipulations which take place in the SPS can be best explained in reference to the entry and translation of specific sentences.

Assuming the English to Spanish mode of operation, let us consider the processing of the following sentence: THE BIG HORSES/ARE NOT GOING TO/RUN SO QUICKLY NOW—wherein "/" is used to separate the predicate phrase from the subject and object phrases. The three first words are immediately flagged as article, adjective and noun by reason of the place where they are found in the MVS. This, in turn, determines there SPS slot assignment, i.e., ABC, respectively. As the "T" key is pressed to enter the term "ARE" the procesor is directed to address location 47 in the KLT, then looks at the subject phrase to determine which of the two possible forms "AM" or "ARE" must be used. The absence of the pronoun "I" ahead of the auxiliary indicates that the KLT address should be incremented to 49 in order to select the form ARE. The terms "NOT", "GOING", and "TO" are the only English forms which can be entered in the upper case mode of their entry keys. Their respective addresses can thus be fetched directly from the KLT and placed in "Q". The suffix "-LY" is assigned to the next slot "R". The extra word "NOW" is recognized as an adverb and placed into the extra slot "S". The letters, symbols and words are fetched from the MVS memory and are loaded for display into the EWS as soon as their addresses are placed in their proper SPS slot location. The entry of the period in the punctuation slot U triggers the translation process.

The translation of English words and combinations thereof is predicated upon the slot occupied by the English word addresses, the particular group of arrays where the words are stored, and any particular indicia which may be held within the SPS in order to indicate a special processing requirement. In the MVS section, the array which groups the nouns is subdivided according to the genders. Gender of the Spanish version of a word is always controlling, regardless of the fact that English version of an object or concept is neutral. Accordingly, "HOUSE:CASA" is stored with "GIRL:NINA" in the feminine sub-array; while "MAP:-MAPA" is stored along with "BOY:NINO" in the masculine sub-array. The storage address of each noun thus automatically provides an indication of the Spanish version gender.

In our example, the English article "THE" translates into Spanish as "EL" "LA" "LOS" or "LAS", depending upon the gender of the noun it qualifies. The address of the words "HORSES CABALLOS" indicates a masuline gender. The entry of "-S" after "HORSE" indicates the plural. Accordingly, the address of the form "LOS" is entered in slot "A".

The plural forms of most nouns and adjectives is automatically formed in Spanish by tagging "-S" to the end-vowel of their singular form of "-ES" to the end-consonants of their singular forms. The feminine version of most adjectives is formed by substituting an "A" for the ending "O" of the masculine form. Nouns and adjectives with irregular plurals in English or Spanish are stored in a separate section of the MVS adjacent to their irregular forms. The same technique is used for adjectives with irregular feminine forms. The address of these words let the processor know that the irregular plural or feminine forms must be obtained by incrementing their address and counting the word separators until the proper form is reached. Table D illustrates the storage of nouns, adjectives and verbs with irregular forms. In the translation of the word "BIG" the address entered in slot C of the SPS for the Spanish version is that of the word BIG incremented until the third location corresponding to the proper irregular plural forms is identified.

TABLE D

| WORD | Main Vocabulary Storage (MVS) | | | | CORRESPONDING LETTERS |
|---|---|---|---|---|---|
| | BYTES | | | | |
| | Address | | Contents | | |
| GO | B | 0 | 1 | 0 F | |
| | | | 2 | 0 8 | G O |
| IR | | | 3 | 0 5 | I |
| | | | 4 | 9 0 | R |
| GOING | | | 5 | F 2 | G |
| (GERUND) | | | 6 | 8 5 | O I |
| | | | 7 | 7 F | N |
| | | | 8 | 2 | G |
| YENDO | B | 0 | 9 | 0 F | |
| (PAST PARTICIPLE) | B | 0 | A | 9 3 | Y E |
| | B | 0 | A | 7 2 | N D |
| | B | 0 | C | 8 0 | O |
| GONE | B | 0 | D | F 2 | G |
| (PAST | B | 0 | E | 8 7 | O N |
| PARTICIPLE) | B | 0 | F | 3 0 | E |
| IDO | B | 1 | 0 | 5 2 | I D |
| (PAST PARTICIPLE) | | | | 8 | O |
| BIG | | | | 0 F | |
| | | | | 1 5 | |
| | | | | F 2 | G |
| GRANDE | C | 0 | 1 | 0 F | |
| | C | 0 | 2 | 2 9 | G R |
| | C | 0 | 3 | D 7 | A N |
| | C | 0 | 4 | 2 3 | D E |
| GRANDE | C | 0 | 5 | 0 F | |
| (FEMININE) | C | 0 | 6 | 2 9 | G R |
| | | | 7 | D 7 | A N |
| | | | 8 | 2 3 | D E |
| GRANDE | | | 9 | 0 F | |
| (PLURAL) | | | A | 2 9 | G R |
| | | | B | D 7 | A N |
| | | | C | 2 3 | D E |

Since the next term "ARE" was followed by "NOT" the address of the Spanish negative "NO" is entered into slot "F".

The progressive form "TO BE GOING TO" is translated with the present and perfect tenses of the verb "IR". The phrase, "TO BE USED TO" as well as the auxiliary "TO DO" (as in I DO DRINK WINE) is translated with the present and perfect tenses of the verb SOLER. The KVS holds the Spanish present and perfect forms necessary to conjugate the following verbs: SER, ESTAR, HABER, IR, SOLER, HACER, TENER, and PODER. Those are the only conjugation forms available in the translation but which suffice to translate conversational English into Spanish within the restrictions previously outlined.

In the example, the phrase "ARE GOING TO" thus, is translated with the present tense of "IR" and in taking into account the plural subject "CABALLOS", to yield the third person plural form "VAN".

In order to economize memory space, only the form "VA" is stored in the KVS. The suffix "N" is added when the word is fetched from the memory for display. The SPS only holds the address of the form "VA" plus a code indicating the third person plural form.

The infinitive "RUN" is translated into "CORRER" without special processing within slot "L". The three terms "SO, QUICK, and -LY" are also translated directly with "TAN" "RAPID" and "-AMENTE", but with a forward shifting of one slot position. The adverb "NOW" translates directly into "YA".

Now, let us consider the entering and translating of the sentence "THEY COULD NOT BE/FLY/ING TO OUR HOUSE IN AUSTIN" into the unit.

There is no subject phase, but only a personal pronoun whose address is held in slot "D". This address indicates that it is a third person plural form which translates into "ELLOS". The form "COULD" translates into "PODIA", plus suffix "-N" which is dictated by the third person plural of the pronoun. This is an adequate substitute for the form "PODRIAN". The negative is entered and translated directly, but placed after the auxiliary. The actuation of the "H" key to enter the infinitive "BE" presents to the unit a choice between the forms "IS" or "BE". The presence of the auxiliary "COULD" dictates that the latter is the proper form to enter. In the translation, the choice between "SER" and "ESTAR" is governed by the following gerund "FLY-ING" which requires the selection of "ESTAR". In the object phrase, the term "FLYING" must be entered in the lower case mode as "FLY" and the suffix "-ING". The address of this verb indicates that it is a regular verb whose past participle and gerund can be formed by substituting "-NDO" for the infinitive "R" form. The processor would fetch an irregular gerund such as "YENDO" from the MVS. The gender of the possessive in the translation of "OUR" is indicated by the address of the noun "HOUSE: CASA". The final phrase "IN AUSTIN" falls into the extra-word slots S and T. The preposition can be found directly in the memory; but the word AUSTIN must be entered manually using the DIRECT key. This mode allows the operator to enter non-translated word of up to ten characters. This feature is particularly useful in entering proper names. At the end of the translation process, the addresses stored in the SPS are used to fetch the words from the memory and load them into the translated sentence storage unit (TSS) 13 from which they are displayed on the readout 4.

The techniques just described are used in the inverse process of entry and translation from Spanish into English.

Figure 5A:
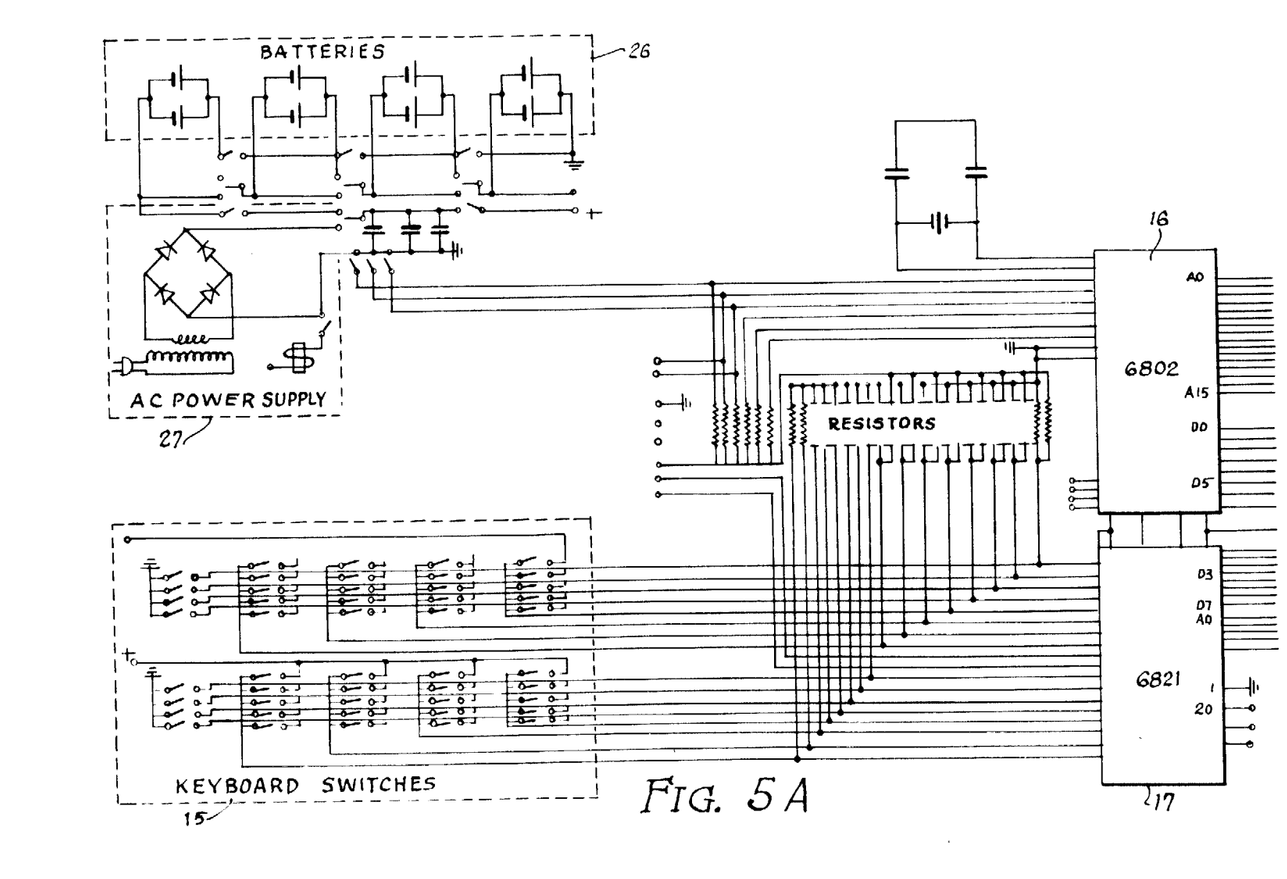
FIGS. 5A and 5B are an electrical schematic of the device.
Figure 5B:
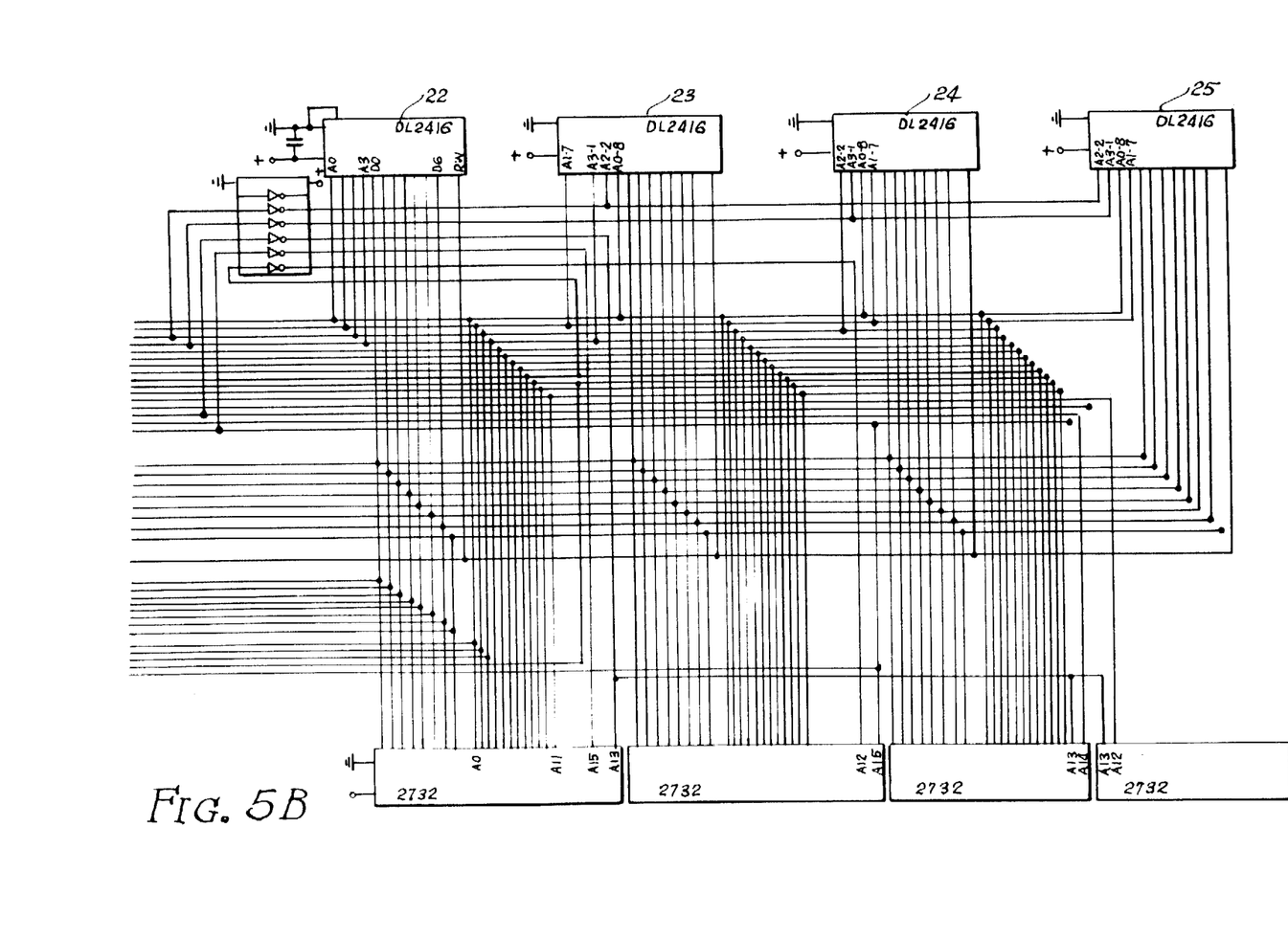
Figure 6:
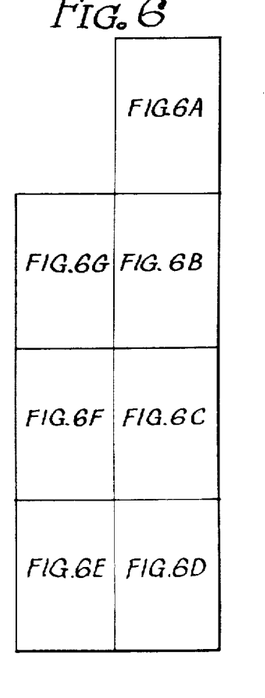
FIGS. 6A through 6G are the program flow diagrams.
Figure 6A:
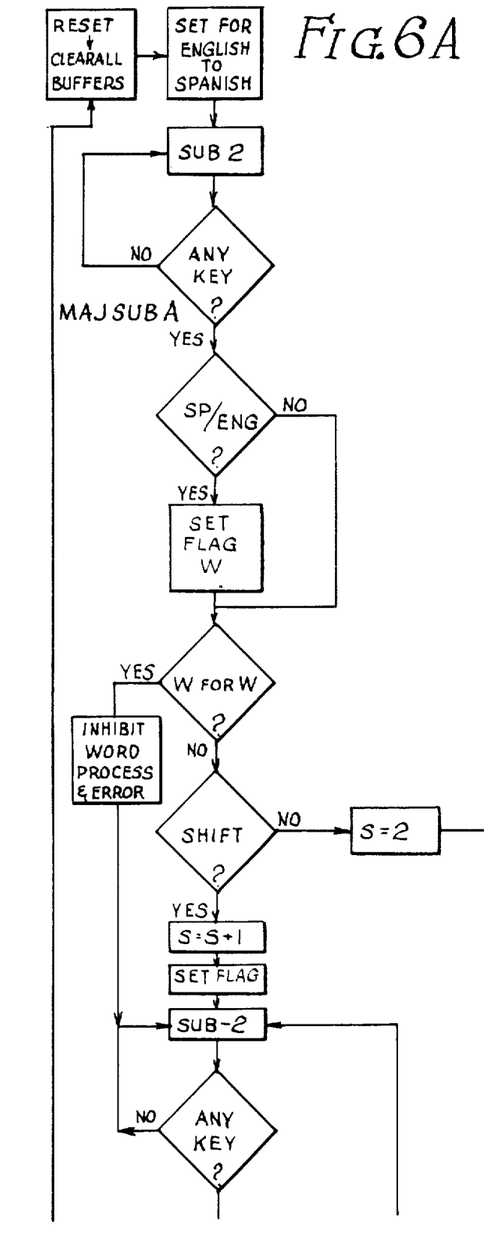
Figure 6B:
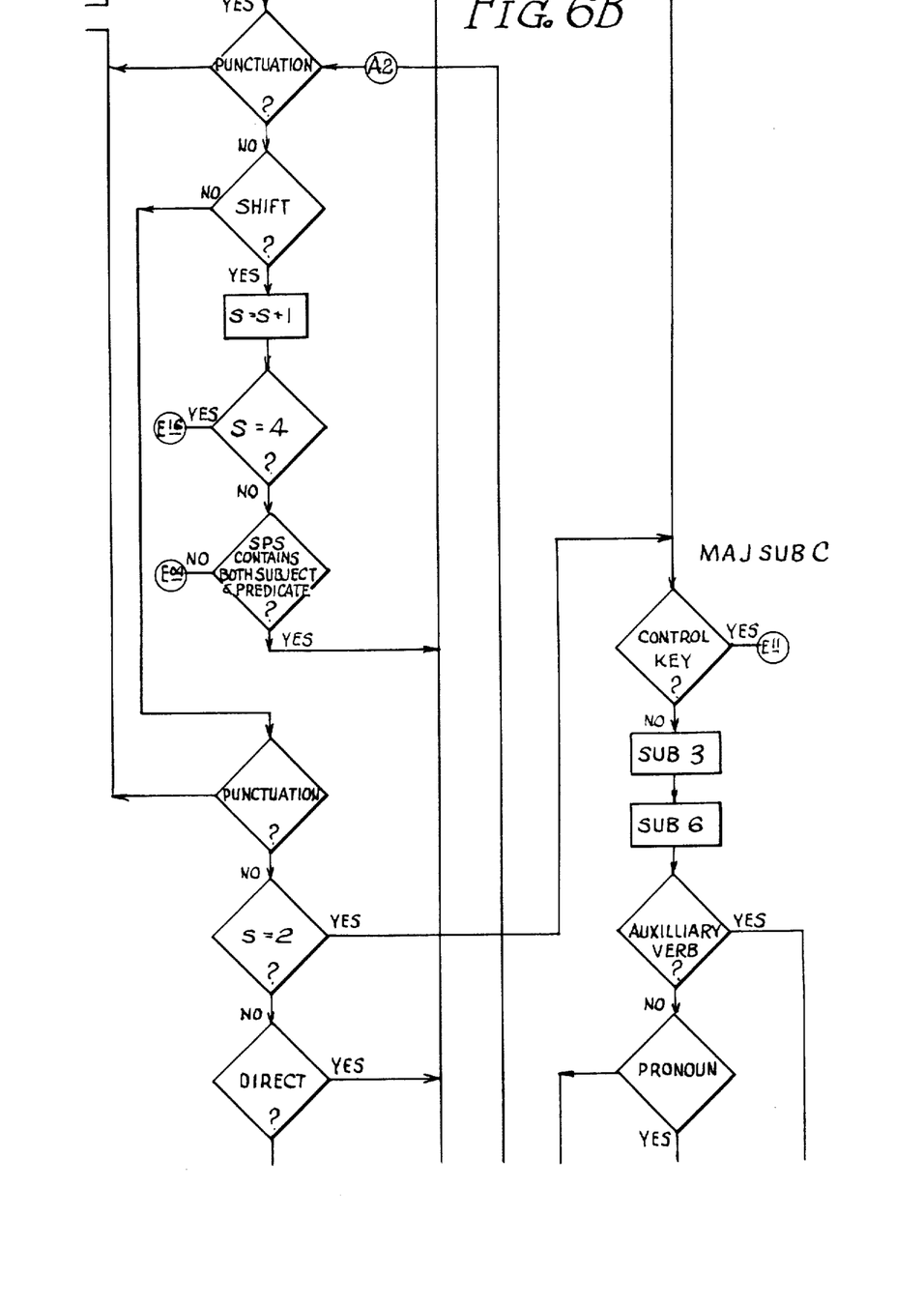
Figure 6C:
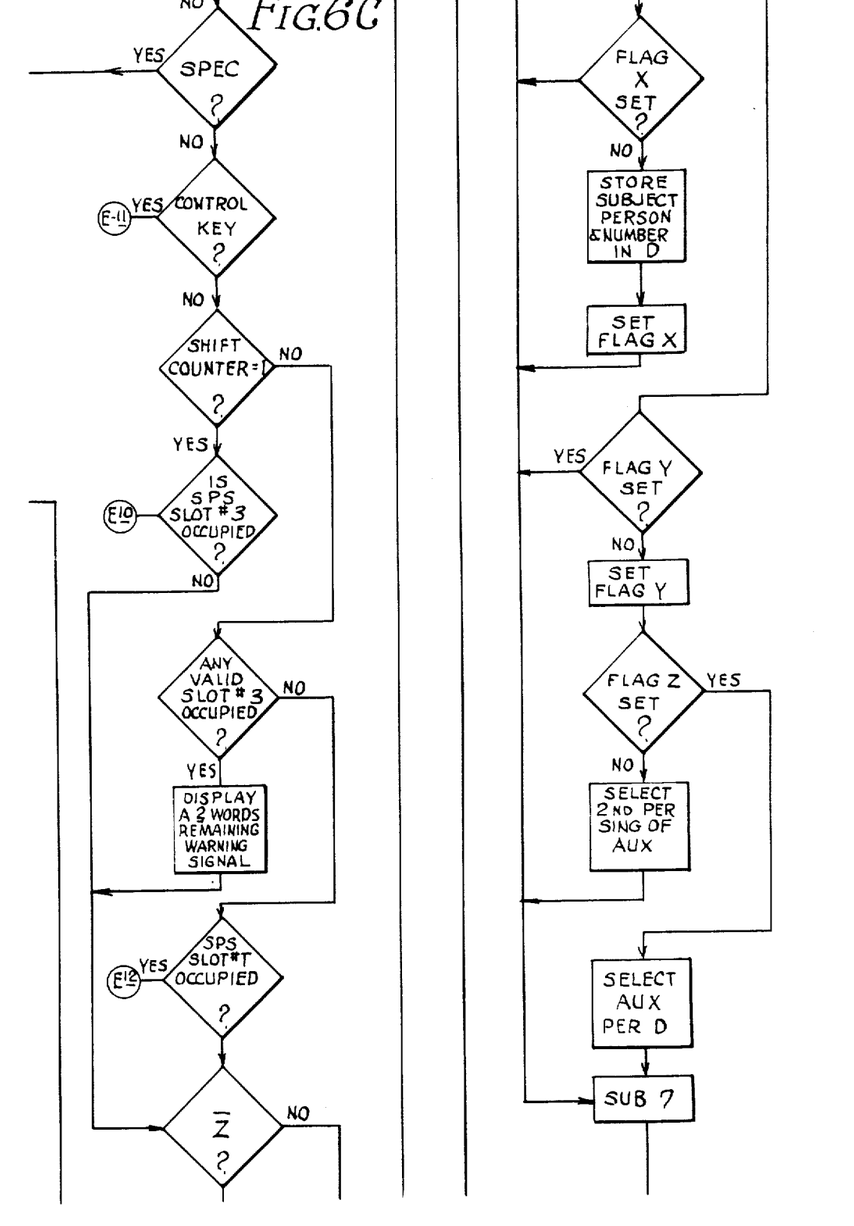
Figure 6D:
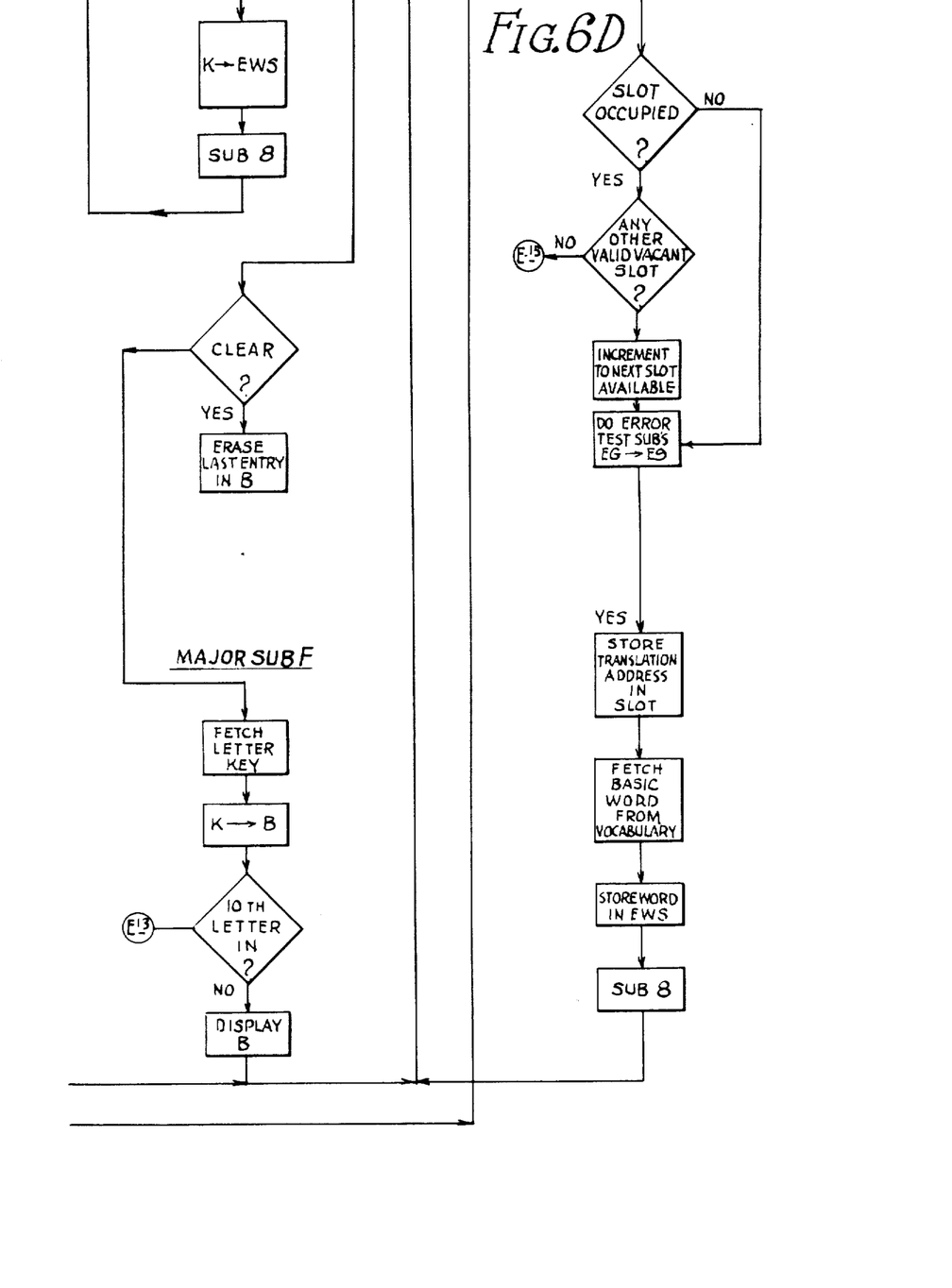
Figure 6E:
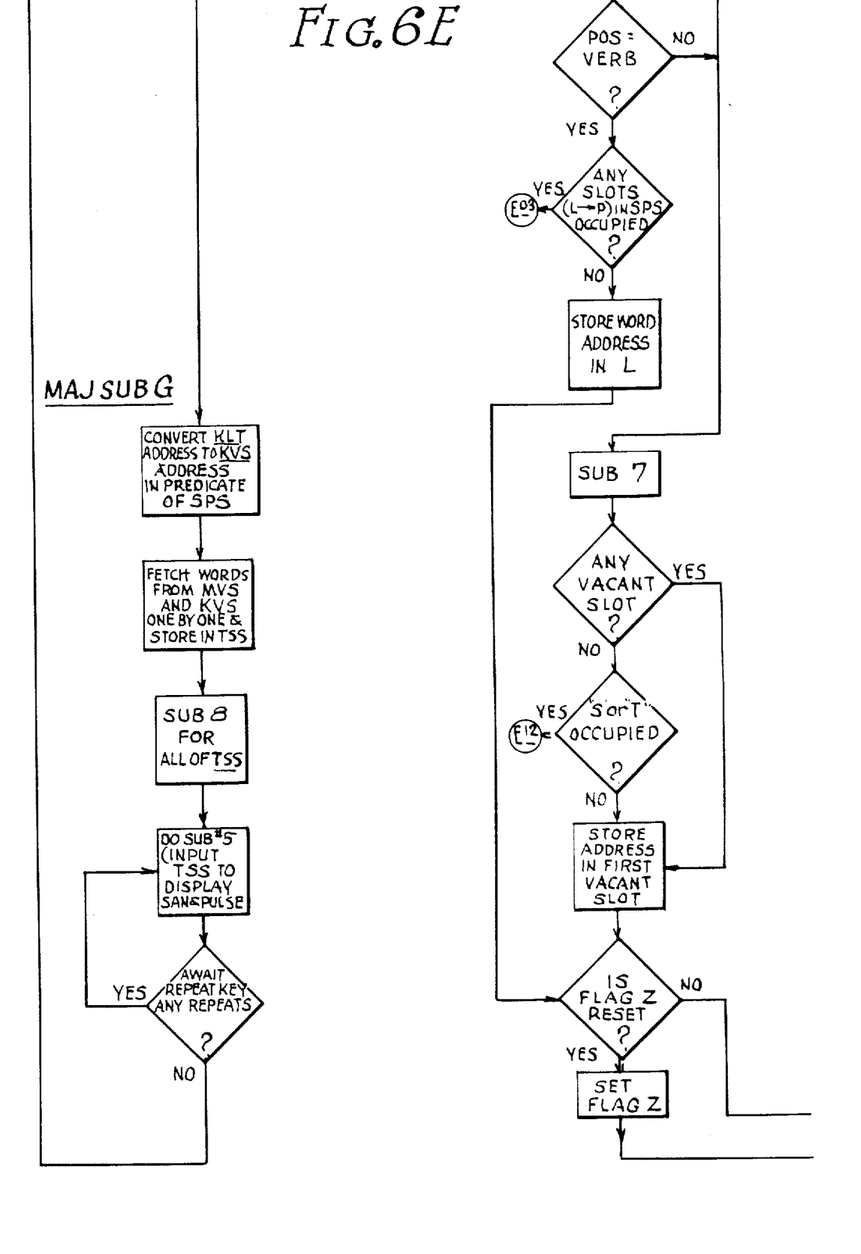
Figure 6F:
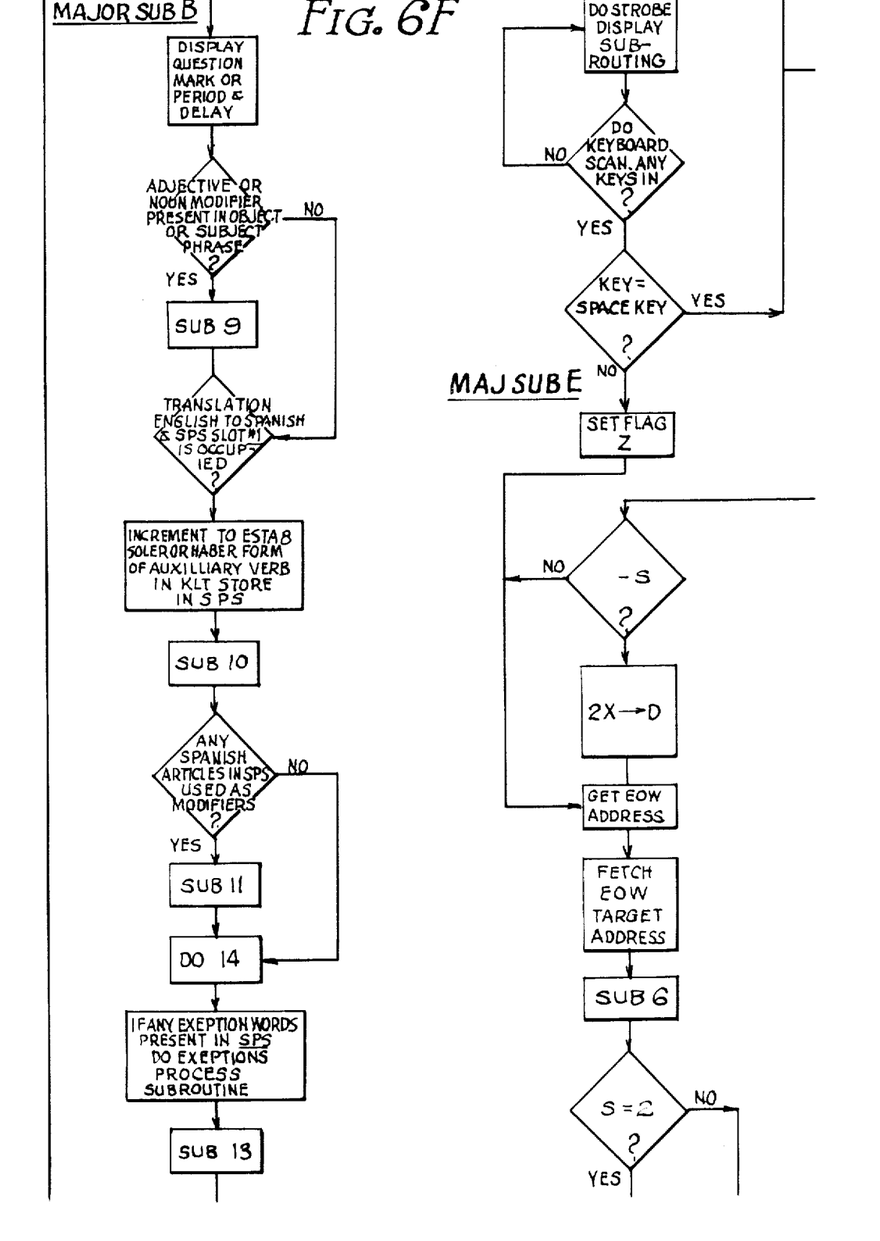
Figure 6G:
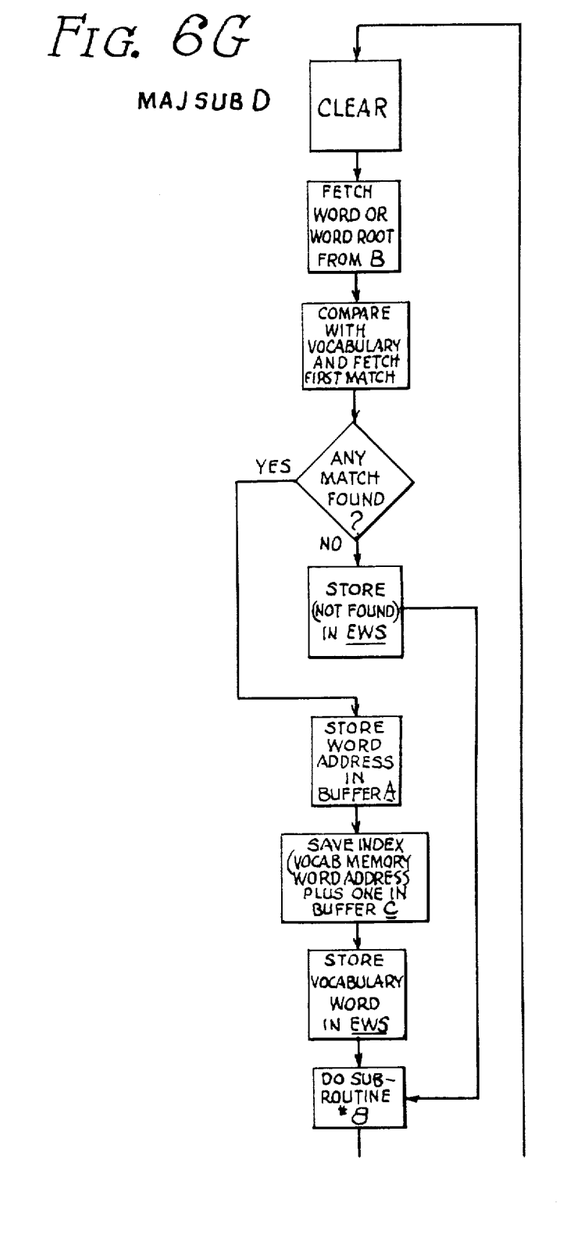

The schematic of FIG. 5 illustrates the interconnections between the keyboard switches 15, the processor modules 16 and 17, the EPROM modules 18, 19, 20 and 21, and the display control units 22, 23, 24 and 25. Module 16 contains the RAM memory 11. Module 18 holds the KLT and KVS. The MVS utilizes module 19, 20 and 21. The unit is powered from a series of batteries 26 or from a power supply 27 operating on household current.

The program which is followed by the processor 5 is organized according to the flow diagram illustrated in FIGS. 6A through 6F.

The program comprises seven major subroutines and 14 minor ones. Major subroutine A manages the entry of letters, words or control commands through the keyboard 3. Major subroutine B controls the processing of a sentence in the SPS after a punctuation mark has been entered. Major subroutine C handles the entry of the predicate phrase into the SPS. Major subroutine D controls the letter by letter entry of words which are not found on the keyboard. Major subroutine E processes the words stored in the EWS and then directs the program to accept a new input from the keyboard. Major subroutine F applies to the entry of letters through the keyboards. Major subroutine G controls the loading of the TSS according to the addresses found in the SPS.

A four-position SHIFT COUNTER S is used to indicate the part of the sentence being processed. S=1 corresponds to the processing of the subject phrase; S=2 corresponds to the processing of the predicate phrase; S=3 corresponds to the processing of the object phrase; and S=4 indicates an error in the use of SHIFT commands.

The term POS corresponds to the part-of-speech value given to a word as determined by the location of that word in the memory. The POS is derived by analyzing the address of the word in the KVS or the MVS.

Flag X is set whenever a noun or pronoun is entered as the subject of a sentence. Flag Y is set when the first auxiliary verb is entered. This first auxiliary verb is always the one to be conjugated according to the person and number of the subject. Flag Z is reset while a yellow key or a suffix key is being processed. Flag W is set during a Spanish to English translation.

Buffer A is used to hold the address of a spelled word fetched from the MVS or that of a yellow keyword or that of a word being entered in the predicate sentence. Buffer B works in conjunction with the LETTER PROCESSING AREA (LPA) to store the root of the word being spelled from the keyboard. Buffer C remembers the address of the last matching word found in the vocabulary and being displayed for acceptance or rejection by the operator. Buffer D stores the status of the subject which controls the conjugation of the auxiliary in the predicate sentence according to the following code.

first person singular=11;
second person singular=21;
third person singular=31;
first person plural=12;
second person plural=22; and
third person plural=32.

The minor subroutines labeled SUB 2 through SUB 14 are not illustrated in the flow diagram but are described in Table E. These subroutines can be easily programmed into the device by a person skilled in the art of computer programming.

The improper use of the unit results in the display of a variety of error codes labled E 03, E 04, E 10 through E 13, E 15 and E 16 whose meanings are given in Table F. The implementation of these error codes is shown in the flow chart of FIG. 6B (e.g. E 16 corresponds to too many shift commands).

The addition of a communcation interface connected to the inputs and outputs of the ESS and TSS could be added to allow remote display of the entered and translated sentences and two-way conversations between two persons of different linguistic backgrounds, either by telephone or radio.

TABLE E

| | Minor Subroutines |
|---|---|
| SUB 2 | STROBE DISPLAY |
| SUB 3 | FIND KEY JUST INPUTTED |
| SUB 4 | ERROR CODE DISPLAY |
| SUB 5 | SCAN AND PULSE DISPLAY |
| SUB 6 | (POS) DECIPHER WORD ADDRESS |
| SUB 7 | (SAS) SLOT ASSIGNMENT PER: POS VALUE, SLOT OCCUPANCY, AND POSITION IN SENTENCE |
| SUB 8 | CONVERT MEMORY LETTER CODE (4 BITS) TO LED DISPLAY (8 BITS) |
| SUB 9 | MOVE TRANSLATED WORD ADDRESS TO APPROPRIATE LOCATION |
| SUB 10 | WORD ADDITION OR DELETION |
| SUB 11 | CONJUGATE ARTICLE OR ADJECTIVE PER NOUN POS |
| SUB 12 | PROCESS EXCEPTION TO RULE |
| SUB 13 | TEST FOR VERB MODIFIER |
| SUB 14 | ERROR SEARCH |

TABLE F

| | Error Code |
|---|---|
| 03 | MORE THAN ONE VERB IN OBJECT OR VERB IN IMPROPER SLOT |
| 04 | MISSING SUBJECT OR VERB IN PREDICATE |
| 10 | MORE THAN THREE PHRASES |
| 11 | ILLEGAL USE OF CONTROL KEYS |
| 12 | SENTENCE TOO LONG |
| 13 | WORD TOO LONG |
| 15 | IMPROPER SENTENCE FORMAT |
| 16 | TOO MANY "SHIFT" COMMANDS |

While I have described the preferred embodiment of the invention and suggested modifications and additions thereto, it should be understood that other embodiments and applications to different languages could be implemented without departing from the spirit of this invention and the scope of the appended claims.

What is claimed is:

1. A visual communication device which comprises:
a keyboard having alphabetic keys for entering multiple words in a preset syntax, one character at a time, in order to form sentences;
an addressable vocabulary storage memory for storing words in both a base language and a target language, such words being grouped at addresses within the memory according to their morphological functions;
means responsive to the actuation of said keys for addressing said vocabulary storage memory and for fetching therefrom the words and corresponding addresses which equate to the ordered combinations of characters keyed in;
a sentence pattern storage memory which is used to store the morphologically-related addresses of the base-language words, which comprise a particular sentence, in a predetermined syntactical order;
means for reordering the addresses of the the base language words selected from the keyboard in accordance in with the morphological and syntactical rules for the grammar of the target language;

a means responsive to said means for reordering, for fetching from the vocabulary storage memory, the words of the target language corresponding to the reordered addresses; and a means for displaying and fetched words of the target language.

2. The device claimed in claim 1 which further comprises:

dedicated keys for entering entire words or word combinations with a single keystroke, said entire words or word combinations having been selected as a function of their frequency of use in common conversations.

3. The device claimed in claim 2 which further includes:

a vocabulary storage memory comprised of;

a first memory for storing words in both a base language and a target language, such words being grouped within such memory according to their morphological functions and accessible by means of spelling them out letter by letter on the alphanumeric keys;

a second memory for storing those baselanguage words and corresponding target-language translations thereof which can be entered in a single keystroke by means of said dedicated keys;

means responsive to the actuation of said keys for addressing both the first and second memories, and for fetching the selected words therefrom and retaining the addresses of said selected words.

4. The device claimed in claim 3 wherein said sentence pattern storage memory comprises:

a subject phrase storage area;

a predicate phrase storage area; and an object phrase storage area.

5. The device claimed in claim 4 wherein the subject phrase storage area, the predicate phrase storage area and the object phrase storage area each comprises a plurality of slots which are used to store the morphologically-related addresses of the words of a particular sentence in a predetermined syntactical order.

6. The device claimed in claim 5 wherein said predicate phrase area comprises:

a means for accepting addresses of a series of auxiliary verb forms, and for coupling said forms with the infinitive, past participle and gerund modes of verbs to create present, past and future conjugations of said verbs.

7. The device claimed in claim 6 wherein said dedicated keys include keys for entering auxiliary verb forms, articles, prepositions, personal pronouns, demonstrative pronouns and interrogative adverbs.

8. A visual communication device which comprise:

a keyboard having both alphabetic keys for entering words character by character and dedicated keys for entering entire words or combination thereof in a single keystroke, said entire words or combinations thereof having been selected as a function of their frequency of recurrence in common conversations;

a first addressable memory for storing baselanguage words and corresponding target-language translations thereof, said base language words and corresponding translations grouped in said first memory according to their morphological functions, with nouns further grouped according to number and gender, adjectives further grouped according to number, gender and irregular formation, and verbs further grouped on the basis of regularity or irregularity of formation;

a second addressable memory for storing selected ones of base-language words and corresponding target-language translations thereof which can be entered in a single keystroke by means of said dedicated keys;

a third addressable memory for storing both the addresses of second-memory words and a hexidecimal code for the character represented by each alphabetic key;

means responsive to the actuation of said dedicated keys for fetching from said third addressable memory the addresses of the selected second-memory words, retaining the addresses of such words, and fetching the words themselves from the second memory;

means, responsive to the actuation of said alphabetic keys, for addressing said first memory; comparing the ordered combination of characters selected from said keyboard to the words stored in said first memory; and means for fetching words therefrom which correspond to the combination of characters selected, and means for retaining the addresses of the words stored within said first memory where the words are found;

a means for displaying the words of the base language, selected from said keyboard;

a sentence pattern storage memory for holding a string of addresses of said sentence-forming words from said first and second memories in a synactically-determined order, wherein said sentence pattern storage memory comprises a subject phrase storage area, a predicate phrase storage area, and an object phrase storage area;

a means for reordering said retained addresses of said first and second memories as a function of the morphological and syntactical rules of the target language so that the reordered sequence of addresses correspond to a grammatically correct translation of said sentence-forming word strings;

a means for fetching target language words from said first and second memories; and a means for displaying target language words.

9. The device claimed in claim 8 wherein the subject phrase storage area, the predicate phrase storage area and the object phrase storage area each comprises a plurality of memory locations which are used to store the morphologically-related addresses of the words of a particular sentence in a predetermined syntactical order.

10. The device claimed in claim 9 wherein said predicate phrase area comprises:

a means for accepting the addresses of a series of auxiliary verb forms, and for coupling said forms with the infinitive, past participle and gerund modes of verbs to create present, past and future conjugations of said verbs.

11. The device claimed in claim 10 wherein said dedicated keys include keys for entering auxiliary verb forms, articles, prepositions, personal pronouns, demonstrative pronouns and interrogative adverbs.

* * * * *